J. L. HYLAND.
SHIPPER LOCK.
APPLICATION FILED OCT. 28, 1919.
1,361,061.
Patented Dec. 7, 1920.
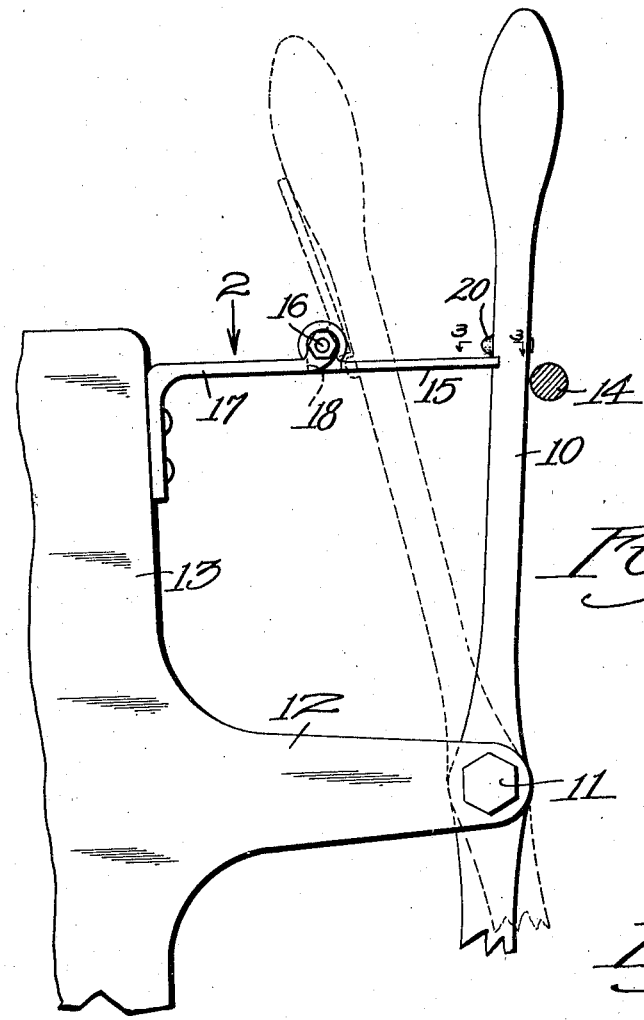
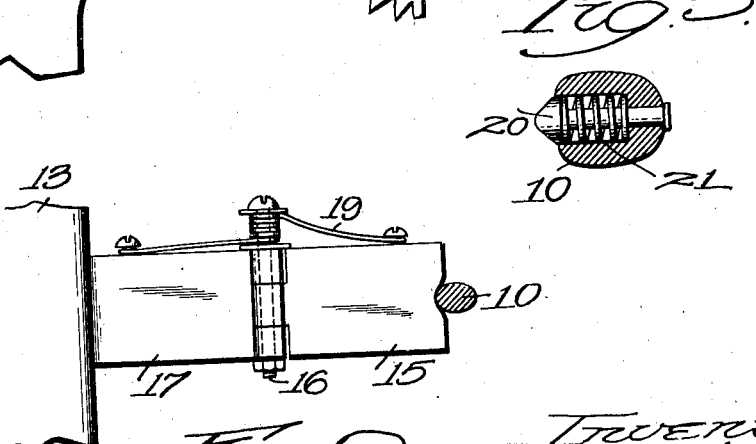

# UNITED STATES PATENT OFFICE.

JAMES L. HYLAND, OF WEBSTER, MASSACHUSETTS.

SHIPPER-LOCK.

1,361,061.

Specification of Letters Patent.

Patented Dec. 7, 1920.

Application filed October 28, 1919. Serial No. 333,979.

*To all whom it may concern:*

Be it known that I, JAMES L. HYLAND, a citizen of the United States, residing at Webster, in the county of Worcester and State of Massachusetts, have invented a new and useful Shipper-Lock, of which the following is a specification.

This invention relates to a device for automatically locking a shipper in off position so as to prevent accidental movement thereof.

In many machines, and particularly in cloth folding machines, the unintended starting of the machine often results in injury to the operator or to the work. Such unintended starting is very liable to occur through accidental movement of the shipper from its off position.

It is the object of my invention to prevent such accidents by automatically locking the shipper whenever it is moved to off position and retaining the shipper in such position until manually unlocked and released.

My invention further relates to certain arrangements and combinations of parts which will be hereinafter described and more particularly pointed out in the appended claims. A preferred form of my invention is shown in the drawings, in which, Figure 1 is a side elevation of a shipper with my improved lock applied thereto;

Fig. 2 is a plan view of the lock, and

Fig. 3 is a detail sectional view taken along the line 3—3 in Fig. 1.

Referring to the drawings, I have shown a shipper 10 pivoted at 11 to a projection 12 forming a portion of a machine frame 13. A stop pin 14, suitably supported, limits the movement of the shipper to off position.

My improved lock comprises an arm 15 pivoted by a bolt 16 to a bracket 17 which is fixed to the frame 13. A shoulder 18 on the arm 15 engages a corresponding shoulder on the bracket 17 and forms a stop to limit downward movement of the arm 15. A spring 19 is mounted on the bolt 16 and the opposite ends of the spring are attached to the bracket 17 and arm 15 respectively, the spring tending to move the arm 15 to the position shown in full lines in Fig. 1.

A stud 20 (Fig. 3) is slidably mounted in a recess in the shipper 10 and is yieldingly pushed outward by a light coil spring 21.

When the machine is in operation, the shipper is in the position shown in dotted lines in Fig. 1 and the arm 15 extends upward alongside of the shipper, the tension of the spring 19 being insufficient to move the shipper. When, however, the shipper is manually moved to the off position shown in full lines in Fig. 1, the arm 15 swings downward, pushing the stud 20 out of its path, and assuming the position shown in full lines in Fig. 1. In this position the shipper is securely locked from reverse movement, the stud 20 acting as a latch for the arm 15.

It is necessary to manually press the stud 20 into its recess and to manually move the arm 15 before the shipper can be moved to start the machine.

It will be seen therefore, that my improved lock becomes operative whenever the shipper is moved to off position, without requiring any attention from the operator. When the shipper is once locked, it can not be released except by manual and intentional removal of the locking arm.

Having thus described my invention, it will be evident that changes and modifications can be made therein by those skilled in the art within the spirit and scope of my invention as set forth in the claims, and I do not wish to be otherwise limited to the details herein disclosed, but what I claim is:—

1. A shipper lock comprising a member yieldingly movable to lock the shipper in off position, and a latch to hold said member in locking position, said latch and said member being each manually movable to release the shipper.

2. A shipper lock comprising a member yieldingly movable to lock the shipper in off position, a stop to limit such yielding movement, and a latch to prevent return movement of said member until said member is manually released.

In testimony whereof I have hereunto affixed my signature.

JAMES L. HYLAND.